United States Patent [19]

Birkner

[11] Patent Number: 4,749,990

[45] Date of Patent: Jun. 7, 1988

[54] IMAGE DISPLAY SYSTEM AND METHOD

[75] Inventor: David A. Birkner, Wellesley, Mass.

[73] Assignee: Computer Design and Applications, Inc., Waltham, Mass.

[21] Appl. No.: 800,987

[22] Filed: Nov. 22, 1985

[51] Int. Cl.$^4$ ................................................. G06F 3/14
[52] U.S. Cl. .................................... 340/799; 340/723; 340/750; 364/421
[58] Field of Search ..................... 367/71, 72; 364/421, 364/515; 340/717, 799, 750, 723

[56] References Cited

U.S. PATENT DOCUMENTS

| | | | |
|---|---|---|---|
| 3,653,001 | 3/1972 | Minke | 340/717 |
| 4,467,461 | 8/1984 | Rice et al. | 367/71 |
| 4,550,315 | 10/1985 | Bass et al. | 340/799 |
| 4,558,438 | 12/1985 | Jones et al. | 367/71 |
| 4,564,915 | 1/1986 | Evans et al. | 364/521 |
| 4,580,242 | 4/1986 | Suzuki et al. | 340/799 |

Primary Examiner—Howard A. Birmiel
Attorney, Agent, or Firm—David W. Gomes

[57] ABSTRACT

The present invention generally provides an image display system having display means, image memory means for storing image data in the form of rows and columns of pixels with each pixel having a value representing the intensity level thereof, processor means for processing the image data on a selectable basis and in a selectable manner, and display memory means for receiving and storing image data from the processor means for use by the display means. The method of the present invention provides for displaying images from image data in the form of rows and columns of pixels with each pixel having a value representing the intensity level thereof, comprising the steps of: storing the image data in a random access memory means; selectively reading the image data from the random access memory means; selectively processing the image data read form the random access memory means; storing the processed image data in a display memory means for display purposes; and displaying the stored processed image data.

18 Claims, 2 Drawing Sheets

FIG. I

IMAGE DISPLAY SYSTEM AND METHOD

BACKGROUND OF THE INVENTION

1. Field of the Invention

The present invention generally relates to image display systems which process image data in the form of rows and columns of pixel data and, in particular, to such systems which process such pixel data for the purpose of modifying any of a variety of the display aspects thereof.

2. Statement of the Prior Art

Image display systems used for processing and displaying images derived from digital data are well known and have taken a variety of forms. Generally, these forms may be divided into those systems which use digital processing exclusively and those systems which use combinations of digital and analog processing.

In the area of digital processing, data is typically handled on either a pixel by pixel basis or a vector basis. The vector approach is a shorthand form of notation which allows groups of pixels to be defined by a predetermined number of digital characters independently of the number of pixels being defined. This method is typified by U.S. Pat. Nos. 3,925,776 and 3,944,997. In general, the vector method is noted for economy due to the limited amount of data necessary to define a display. This makes such systems particularly adaptable to installations requiring the long-distance transmission of image data where the accuracy of very large blocks of data is at risk. A related benefit is the reduction of the access time for such information, thus increasing the efficiency for a given data base by practically supporting multiple users. Unfortunately, the vector method is essentially limited in the amount of detail which may be displayed and thus is not suitable for high resolution applications.

Situations requiring greater detail usually process and display data in the form of individual pixels with each pixel having an intensity or brightness level associated therewith. Due to the large amount of data which must be handled by such pixel systems, they are generally cumbersome and inefficient to use. The inefficiency is related directly to data handling as the accessing and processing times required are proportional to the numbers of pixels used, and usually impact both the operators time of an individual user and the practicality of a multiple user system. This problem is further inflamed by high resolution requirements which increase the number of pixels per image.

The other form of image processing generally includes a combination of analog and digital processing. This method tends to be inflexible and costly inasmuch as analog circuits are not conveniently variable and one or more analog/digital conversions of the data are required. The limited variability of analog circuits typically requires that hard-wired circuitry be changed to affect any significant display parameter or hardware changes. Further costliness is incurred in high resolution displays which require high speed processing circuitry to supply the processed image signal. The displayed image presented is also limited in that the entire display must be treated and processed as a whole. Generally, it is not possible to independently do different manipulations or different portions of the displayed image.

For these reasons, needs arise in areas requiring the display of exceptional detail, such as medical imaging, for a pixel handling system which is flexible and practical to use. Some achievements have been recently made which provide for high speed processing of pixel data and thereby enable development of a practical, time efficient system. One example is the area of instant imaging cat-scanning which processes the sampled digital data from a cat-scanner during the scanning process to provide a completed image very shortly after the completion of scanning. An example of such a system is described in U.S. Pat. No. 4,135,247. Unfortunately, such systems are limited in the flexibility with which the image data produced can be handled.

SUMMARY OF THE INVENTION

Accordingly, the present invention provides an image display system having the qualities of high resolution, efficient speed and flexibility of image display parameters and display hardware. The present invention generally provides an image display system having display means, image memory means for storing image data in the form of rows and columns of pixels with each pixel having a value representing the intensity level thereof, processor means for processing the image data on a selectable basis and in a selectable manner, and display memory means for receiving and storing image data from the processor means for use by the display means. When integrated with a host computer, the present invention further provides terminal means for enabling control of the processor means via the host computer. The actual processing of pixel data is done by the processor means which includes pipelined means for processing the data during transfer from the image memory means to the display memory means. The pipelined means for processing is controlled with a microword processor.

The method of the present invention provides for displaying images from image data in the form of rows and columns of pixels with each pixel having a value representing the intensity level thereof, comprising the steps of: storing the image data in a random access memory means: selectively reading the image data from the random access memory means; selectively processing the image data read form the random access memory means; storing the processed image data in a display memory means for display purposes; and displaying the stored processed image data.

BRIEF DESCRIPTION OF THE DRAWINGS

The present invention is illustratively described below in reference to the accompanying drawings in which.

DETAILED DESCRIPTION OF THE DRAWINGS

Figure 1:
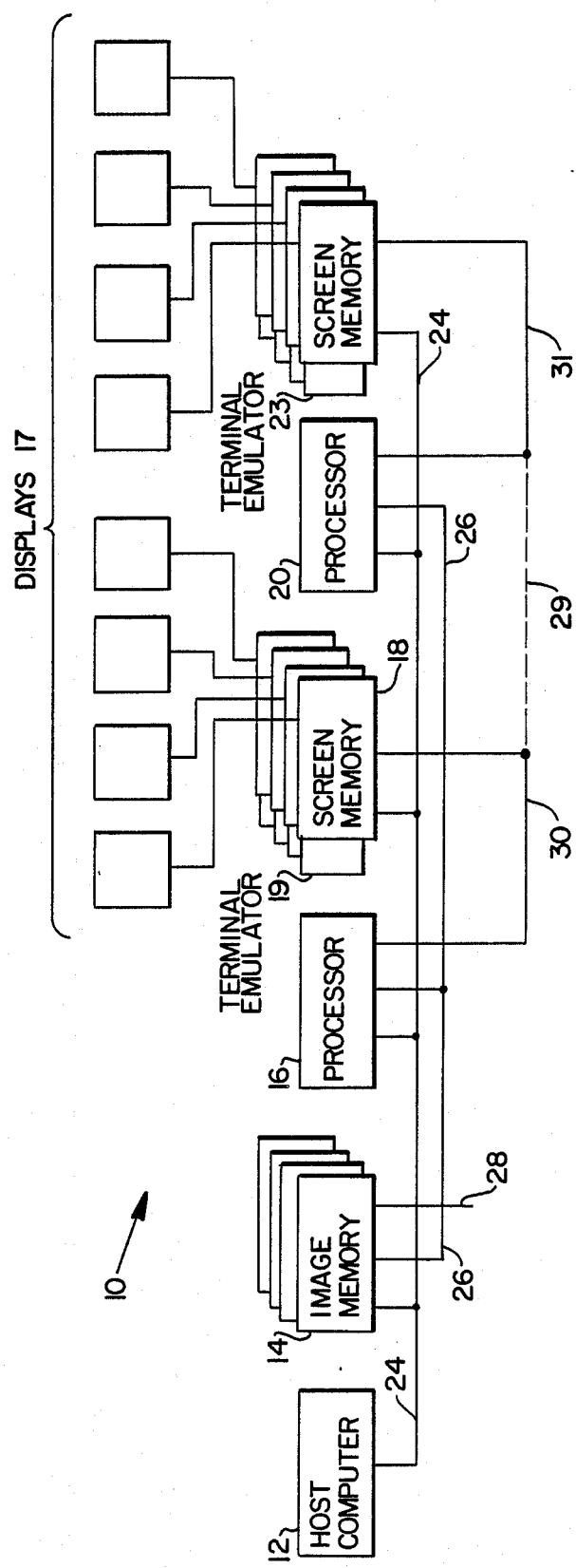
FIG. 1 is a block diagram of one embodiment of the present invention.
Figure 2:
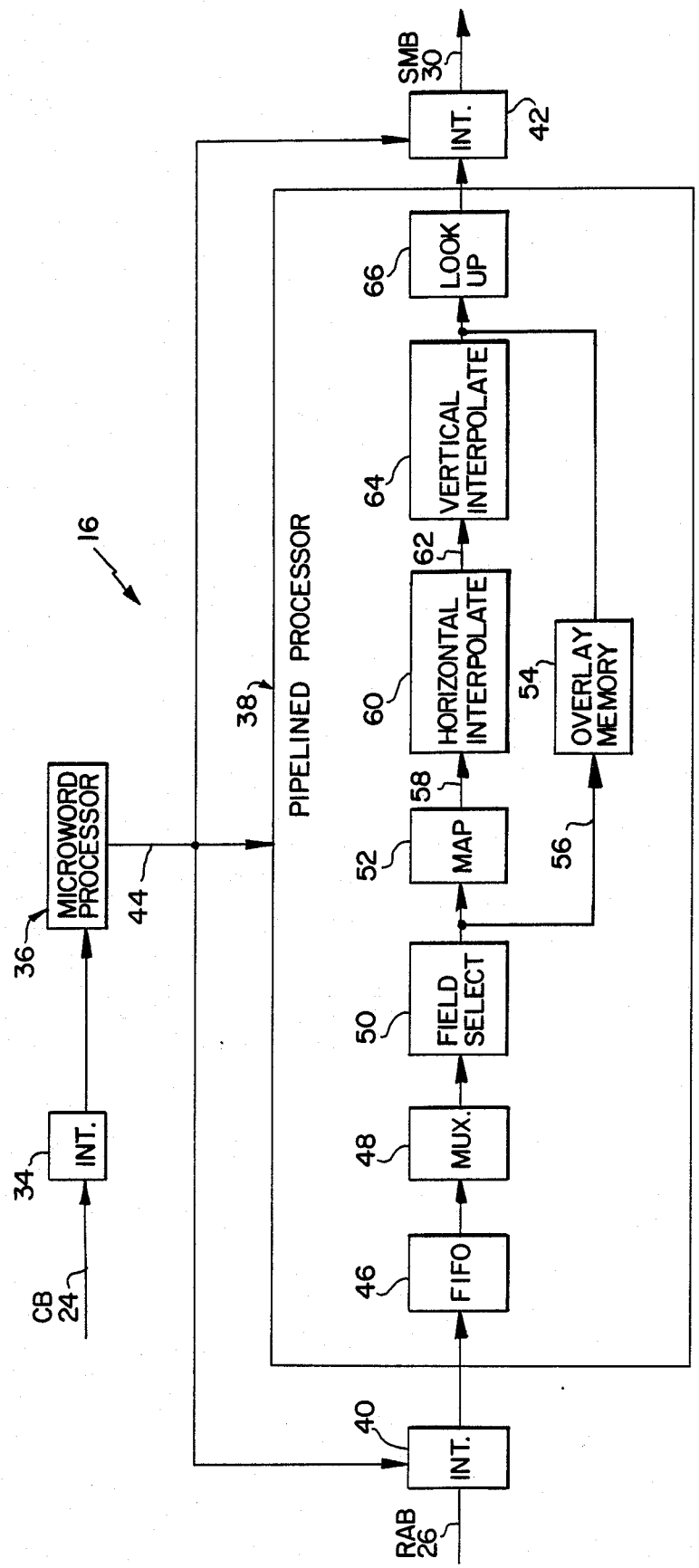
FIG. 2 is a block diagram of a portion of the embodiment of FIG. 1.

The interconnections or wires shown in FIGS. 1 and 2 in fact represent multiple wire busses, but are shown as single lines for purposes of clarity.

One embodiment of the overall system 10 of the present invention is shown FIG. 1. The system 10 generally includes a host computer 12, image memory means 14, processor means 16, screen memory means 18 and display means 17. An additional processor 20 and an additional screen memory 22 are optionally included. Any discussion below referring to processor 16 and screen memory 18 may be modified to refer to processor 20 and screen memory 22, respectively.

Host computer 12 may be any commercially available computer or microprocessor having the necessary capabilities. In the present embodiment it is a MicroVAX II available from Digital Equipment Corporation.

Image memory 14 is a shared memory system used to contain the raw image data previously unprocessed for the purposes of the present invention. This data may of may not have been processed prior to storage in image memory 14. It is this raw data which is transferred by processor 16 to screen memory 18 for display. This data may also be used by processor 20 or additional processors, not shown, for separate display purposes. The raw image data remains in image memory 14 regardless of useage by one or more processors. The image data is in the form of rows and columns of pixels for each image with each pixel having a value associated therewith representing the relative brightness or intensity with which that pixel needs to be illuminated. For example, either 8 or 16 bits may be used per pixel, thus allowing from 256 to over 65,000 separate relative intensity levels. This is used to support known medical imaging techniques of computer aided tomography and magnetic resonance imaging where 10 and 16 bit intensity levels, respectively, are being produced. Image memory 14 is random access and may be constructed in a manner which makes it adaptable for different amounts of needed memory space. For example, a basic system can be constructed which supports anywhere between 1 and 8 memory circuit boards, each containing 4 megabytes, for a total of 32 megabytes for the system 10.

Image memory 14 may also be used to store overlay graphics information for the purpose of displaying overlay graphics in combination with normal images. Processor 16 normally handles the overlay information in transferring it to screen memory 18 for display. For example, the overlay information may be stored in image memory 14 with 16 levels of relative intensity represented by 4 bits. Image memory 14 may also have non-image data stored therein including image data access paths and textual data corresponding to the image data stored therewith.

Processor 16 is typically a high performance, fixed point processor used to move image data from image memory 14 to the screen memory 18. The various functions which are available for viewport modification during the transfer of image data include intensity level windowing and scaling, zoom up and down with bilinear interpolation, location selection for images within the display, combining of several images to form a single image in the screen memory, controllable roaming and panning around different portions of a larger and partially undisplayed image, and high speed updating of the image memory data to produce moving cinematic presentations of the display data.

Screen memory 18 generally includes data storage means for the image actually being displayed along with look-up tables and digital-to-analog converters for producing the necessary display voltages from the stored digital data. It is contemplated by the present invention to use the 8 bits per pixel or 256 relative intensity levels to produce a color presentation. To this end the eight bits of pixel data are each fed to three look-up tables which correspond to three display colors and a separate digital-to-analog converter is provided to convert the output of each look-up table into a display signal voltage.

Also included in screen memory 18 is a terminal emulator means, 19 (23 for screen memory 22). Terminal emulator 19 operates as a terminal for host computer 12 so that control may be had therethrough of the images being displayed. Emulator 19 would typically include a keyboard and potentially other means for software control, such as a mouse. A display for the terminal operator may be provided by the image display of the system 10. This may be done with an interface between the terminal emulator 9 and screen memory 18 which causes alpha-numeric characters and a cursor, both controlled by the emulator, to be overlayed on the displayed images. Such an interface would include a character overlay memory. This arrangement allows an operator to view an image while simultaneously accessing software in host computer 12 which will change the image presentation. Thusly, adjustments and changes may easily be made to the displayed image without the operator having to divert his attention.

The above components are linked by a plurality of buses including a control bus 24, (hereinafter "CB"), a random access bus 26, (hereinafter "RAB"), and a screen memory bus 30, 31 (hereinafter "SMB"). CB 24 couples the host computer 12, image memory 14, processors 16 and 20 and screen memories 18 and 22. CB 24 enables the host computer 12 to control and test each of the components shown thus far. It may also be used to transfer data to image memory 14. CB 24 may be implemented by any suitable means, such as with the industrial standard peripheral bus for the MicroVAX II, designated the Q-22 bus. This bus supports 22 bits of address data covering four megabytes of addressable locations and further allows burst transfers of up to 3.5 megabytes per second.

RAB 26 is coupled from the image memory 14 to processors 16 and 20. It provides the random access mode of operation for the processors 16 and 20 with the image memory 14, thus allowing the processors to selectively choose image data therefrom. One example of the operating parameters suitable for the RAB 26 is a 32 bit multiplexed data/address bus with speeds of 40 megabytes per second in the burst mode and 6.6 megabytes per second in the random access mode.

SMB 30 and 31 are dedicated buses intended solely for the transfer of image data from the processors 16 and 20 to the screen memories 18 and 22, respectively. In practice it may be installed as a single bus in the backplane of the system 10 and then sections of it, such as 29, may be removed so that a single bus becomes the specifically dedicated multiple buses 30 and 31.

A sequential access bus 28 may be provided for image memory 14 for the specialized function of high-speed, sequential memory data transfer. It would allow the quick transfer of great volumes of image data from any suitable source to image memory 14. It would further support a broadcast mode which would allow data to be sent to multiple destinations, thus increasing its effective bus band width. It may also be used for high speed data transfer to and from data disks, a modification to the present system not shown herein. One suitable configuration for sequential access bus 28 is a 32 bit multiplexed data/address bus capable of sustained transfers at 80 megabytes per second.

The system 10 of FIG. 1 generally operates in the following manner. Host computer 12 controls the operation of system 10 via software resident therein. Host computer 12 may be controlled by any suitable means such as a terminal or terminal emulator 19, 23. Raw image data is loaded by host 12 into image memory 14 via the CB 24. This might be accomplished directly from some other suitable source, such as a disk drive via the sequential access bus 28. The operator of terminal emulator 19, 23 accesses textual data in image memory 14 and selects images, the desired processing and image display location. In response to this, host computer 12 then loads processor 16 with the addresses in image memory 14 of the selected images and the addresses in screen memory 18 corresponding to the selected location for the processed image and also loads a suitable processing routine or calls up routines already stored in processor 16. Processor 16 addresses image memory 14 via RAB 26 for the selected data and further addresses screen memory 18 via SMB 30 to receive the processed data. The processor 16 then reads the selected pixel data, clocks that data through a pipelined processor to perform the selected processing routines and transmits the processed data to screen memory 18. The pixel data enters processor 16 via RAB 24 and exits via SMB 30 to be stored in screen memory 18. From screen memory 18, the data is converted and masterized for transmission to and display by one of the displays 17. The pixel data so stored in screen memory 18 remains there for so long as as its display is desired. If a change is selected by the operator, the original pixel data is reread from image memory 14 and processed according to the newly selected parameters. If a cinematic display is selected, processor 16 may be programmed either to load screen memory 18 with sequential displays from image memory 14 or to repetitively reread the same data from image memory 14 and perform a different processing routine on each sequential reading.

Host computer 12 may also be simultaneously addressed to process images for more than one operator. Each operator would be serviced by a single screen memory 18 including an individual terminal emulator 19. This is represented in FIG. 1 by a plurality of screen memory blocks or boards 18, each of which is connected to its own display 17. According to the present invention, however, each of these multiple screen memories 18 and operators could be serviced by a single processor 16. Host computer 12 would simply load addressing and processing information for each operator into processor 16 in sequence and could continue to switch back and forth between screen memories 18 as needed.

FIG. 2 shows the processor 16 of FIG. 1 in block diagram form. Processor 16 generally includes an interface 34 coupled to CB 24, a microword processor 36, a pipelined pixel processor 38, a RAB interface 40, and a SMB interface 42. The microword processor 36 is a commonly known microword processor designated 2901C which provides a 72 bit control word. This control word is partially used within processor 36 and partially transmitted via a bus 44 to each of the remaining components in the processor to provide control thereof. Microword processor 36 may also include known registers and memories used in known configurations which produce data under the control of the 2901C processor for internal use and for transmission over bus 44 to the pipelined processor 36.

The pipelined pixel processor 38 is generally intended to include a FIFO register 46 which receives pixel data from the RAB interface 40 in a parallel 32 bit, longword format. This 32 bit longword format is reduced to either 8 or 16 parallel bits by a demultiplexer 48. The intensity level of the pixel data is then processed by a field select module 50 and a mapping module 52. Field select module 50 is intended to only allow a selectable field of intensity levels (for example, 8 out of 16 bits) to pass and sets the remaining intensity levels to either zero (0) or maximum. Mapping module 52 is intended to scale the selected field of intensity levels to the displayable field of intensity levels. Field select module 50 and mapping module 52 may operate on either an arithmetic of look-up table basis or some combination thereof. Such look-up tables coule be reloaded with data by microword processor 36 for each processing routine. An overlay memory 54 is coupled via a bus 56 to receive data from the field select module with respect to graphics overlays to be displayed.

From the mapping module 52, pixel data is passed via a bus 58 to a horizontal interpolator 60, where, if desired, the number of pixel points per line may be interpolated either up or down or by known methods. If image enlargement is necessary additional pixel points need to be interpolated and inserted between known pixel points. This is done by averaging the known intensity levels of adjacent pixels, which known intensity levels are weighted in accordance with their relative horizontal position with respect to the pixel being interpolated. If image reduction is desired, then the same averaging process is performed with the interpolated pixels taking the place of the known pixels.

From the horizontal interpolator 60, pixel data is passed by a bus 62 to the vertical interpolator 64, which performs the same interpolation process as horizontal interpolator 60. Vertical interpolator 64 is different in that it uses both originally known and interpolated pixels from adjacent points on adjacent horizontal lines to interpolate entirely new horizontal lines of pixels. The lines of pixel data generated by vertical interpolator 64 may either be added to the output of horizontal interpolator 60 for image enlargement or used in place thereof for image reduction. The pixels generated by vertical interpolator 64 fall between pixels in preceeding and following rows to form columns of pixels. Thusly, the use of both horizontal and vertical interpolation provides for proportional magnification or demagnification of an image in both dimensions.

The fully interpolated data is then passed to an output look-up table 66 where it is combined with overlay image data from overlay memory 54. This combination process generally involves reading the graphics data into overlay memory 54 one line at a time as it is needed for combination with individual lines of known and/or interpolated image data. Look-up table 66 is essentially used for determining the output intensity level of a pixel where there are coincidental pixels to be displayed for both the image data from vertical interpolator 64 and an overlay from memory 54. Look-up table 66 may be reloaded with data by microword processor 36 for each processing routine. Finally, the output of table 66 is transmitted to a screen memory 18 via the screen memory bus interface 42 and screen memory bus 30.

The embodiment of the present invention described above is intended to be taken in an illustrative and not a limiting sense. Various modifications and changes may be made to this embodiment by persons skilled in the art without departing from the scope of the present invention as defined by the appended claims.

CONCLUSION

The advantages of an image display system produced according to the present invention are many. The design encompassed by the present invention is extremely flexible, allowing great latitude in the size of any given installation while retaining efficient use of the hardware necessary for any size installation. To this end, image memory 14 is easily variable in eight steps between 4 and 32 megabytes. Each system 10 can support up to eight screen memories 18, 22 and their associated emulators 19, 23. Several identical displays 17 may also be run by each screen memory 18, 22. Thusly, system 10 may be efficiently used for anywhere between one and 32 operators.

Another advantage lies in the use of a separate screen memory 18, 22 serviced by the processors 18, 20. This enables the processors to be run independently of the displays and thus allows support of more than one display by each processor which advantageously affects processor efficiency. Separate image memories also provide flexibility in the display means. The only portion of the system 10 which is affected by the requirements of the display 17 is the screen memories 18, 22. This minimizes the amount of circuitry which must be run at the video refresh rate of a display. Thusly, changes in the display 17, such as resolution level only necessitates changes in screen memories 18, 22 and not the entire system 10. Thusly, the quality of any given installation may be efficiently and easily varied in addition to the size.

The arrangement of the present invention further provides a very flexible means for modifying and displaying images which does not necessitate hardware changes and which allows different portions of a display to be independently modified. To this end it is possible to adjust the size and shape of any image and to locate it, or any portion of it, anywhere on the display screen in combination with a variable number of other images, each of which is equally variable. It is possible to roam and pan the displayed image around different portions of undisplayed portions and further to constantly update display data to produce movement both of and within the displayed image. Further, images may be easily combined with overlay indicia and the image display screen may be used to access software and image related text for conveniently modifying the display.

What is claimed is:

1. An image display system, comprising:
   display means;
   random access image memory means for storing image data in the form of rows and columns of pixels with each pixel having a value representing the intensity level thereof;
   processor means for processing said image data on a selectable basis and in a selectable manner; and
   random access display memory means for receiving and storing image data from said processor means for use by said display means, wherein said processor means includes pipelined means for processing said pixelled image data during transfer from said image memory means to said display memory means.

2. The systems of claim 1, further comprising:
   a host computer;
   terminal means for enabling control of said processor means via said host computer;
   control bus coupled to said host computer, said image memory means, said processor means, said terminal means and said display memory means;
   random access bus means coupled to said image memory means and said processor means; and
   screen memory bus means coupled between said processor means and said screen memory means.

3. The system of claim 2, wherein said image memory means includes means for storing other data in addition to said image data, said other data including image data access paths and textual data describing the image data stored therewith.

4. The system of claim 2, wherein said terminal means includes terminal emulator means coupled to said screen memory means for allowing use of said display means as a terminal display means in the control of said host computer and thereby said processor means.

5. The system of claim 2, wherein said display means includes means for displaying each pixel of said image data at one of a predetermined number of relative intensity levels, further wherein said values stored in said image memory for each said pixel represent a larger number of relative intensity levels than said predetermined number, and still further wherein said processor means includes means for selecting a range of said pixel values to be displayed from said image memory and for scaling the selected pixel values to the range of relative intensity levels that are displayable by said display means.

6. The system of claim 2, wherein said processor means includes means for updating image data stored in said display memory means, for causing the image displayed therefrom to show movement.

7. The system of claim 6, wherein said means for updating includes for causing said movement to appear as relative movement between different portions of the image displayed.

8. The system of claim 6, wherein said means for updating includes means for causing said movement to appear as movement of the displayed image around different portions of an undisplayed larger image.

9. The system of claim 2, wherein said processor means includes for combining and transferring image data from a plurality of separate images, as stored in said image memory means, into said display memory means for display as a single image.

10. The system of claim 9, wherein said image memory means includes means for storing overlay graphics data for selection and use by said processor means in combination with said image data.

11. The system of claim 10, wherein said overlay graphics data is stored in said image memory means with sixteen levels of relative intensity.

12. The system of claim 1, wherein said processor means includes a microword processor means for controlling said pipelined means for processing.

13. The system of claim 12, wherein said pipelined means for processing includes means for enlarging image data stored in said image memory by interpolating data for additional pixels for location between pixels stored in said rows and columns in said image memory means.

14. The system of claim 12, wherein said display means includes means for displaying each pixel of said image data at one of a predetermined number of relative intensity levels, further wherein said values stored in said image memory for each said pixel represent a larger number of relative intensity levels than said predetermined number, and still further wherein said pipelined means for processing includes means for selecting a range of said pixel values to be displayed from said image memory and for scaling the selected pixel values to the range of relative intensity levels that are displayable by said display means.

15. The system of claim 12, wherein said processor means includes means for updating image data stored in said display memory means, for causing the image displayed therefrom to show movement.

16. A method of displaying images from image data in the form of rows and columns of pixels with each pixel having a value representing the intensity level thereof, comprising the steps of:

storing said image data in a random access memory;
   selectively reading said image data from said random access memory;
   selectively processing said image data read from said random access memory through a pipelined means for processing;
   storing said processed image data in a random access display memory for display purposes; and
   displaying said stored processed image data.

17. The method of claim 16, wherein said step of processing said image data through said pipelined means for processing includes selectably using interpolation for changing the size of the image presented, selecting a range of intensity levels and mapping those intensity levels for display purposes and selectively combining image data with overlay graphics data also stored in said random access memory.

18. The method of claim 17, wherein said step of processing includes repetetively updating said processed image data stored in said display memory for causing the image displayed therefrom to show movement.

* * * * *